(12) United States Patent
Lu

(10) Patent No.: US 11,249,934 B2
(45) Date of Patent: Feb. 15, 2022

(54) DATA ACCESS METHOD AND APPARATUS

(71) Applicant: Huawei Technologies Co., Ltd., Shenzhen (CN)

(72) Inventor: Shengwen Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 16/824,283

(22) Filed: Mar. 19, 2020

(65) Prior Publication Data
US 2020/0218685 A1 Jul. 9, 2020

Related U.S. Application Data

(63) Continuation of application No. PCT/CN2017/103203, filed on Sep. 25, 2017.

(51) Int. Cl.
*G06F 13/42* (2006.01)
*G06F 9/455* (2018.01)
*G06F 13/20* (2006.01)

(52) U.S. Cl.
CPC .......... *G06F 13/42* (2013.01); *G06F 9/45558* (2013.01); *G06F 13/20* (2013.01); *G06F 2009/45579* (2013.01)

(58) Field of Classification Search
CPC ....... G06F 13/20; G06F 13/42; G06F 9/45558
See application file for complete search history.

(56) References Cited

U.S. PATENT DOCUMENTS

| | | | |
|---|---|---|---|
| 6,954,806 B2 | 10/2005 | Yosimoto et al. | |
| 9,948,579 B1* | 4/2018 | Sivaramakrishnan | ........................ H04L 67/1097 |
| 10,263,832 B1* | 4/2019 | Ghosh | ..................... H04L 43/16 |
| 2005/0144422 A1 | 6/2005 | McAlpine et al. | |
| 2009/0216964 A1 | 8/2009 | Palladino et al. | |
| 2013/0247056 A1 | 9/2013 | Hattori et al. | |
| 2014/0052932 A1 | 2/2014 | Eidus et al. | |
| 2014/0074539 A1 | 3/2014 | Doering et al. | |
| 2015/0121046 A1 | 4/2015 | Kunjan et al. | |
| 2015/0256552 A1 | 9/2015 | Lee et al. | |

(Continued)

FOREIGN PATENT DOCUMENTS

| | | |
|---|---|---|
| CN | 1761222 A | 4/2006 |
| CN | 101068237 A | 11/2007 |

(Continued)

OTHER PUBLICATIONS

Su Yong, et al., "A Low Overhead Intra-Node Interconnection Oriented Network Interface Controller," vol. 38, No. 5, May 2015, 14 pages.

*Primary Examiner* — Henry Tsai
*Assistant Examiner* — Christopher A Daley
(74) *Attorney, Agent, or Firm* — Conley Rose, P.C.

(57) ABSTRACT

In a data access method, a processor of a host converts a first descriptor recognized by a virtual machine interface card of the virtual machine into a second descriptor recognized by a physical interface card of the host. The first descriptor includes a virtual machine physical memory address and a data length of accessible data. The physical interface card of the host obtains, based on the second descriptor, a physical address that is in a memory and to which the virtual machine physical memory address is mapped, and accesses the accessible data according to the physical address in the memory.

20 Claims, 6 Drawing Sheets

(56) References Cited

U.S. PATENT DOCUMENTS

| | | | |
|---|---|---|---|
| 2015/0332116 | A1 | 11/2015 | Paschalakis et al. |
| 2016/0011982 | A1 | 1/2016 | Sandoz et al. |
| 2016/0266923 | A1 | 9/2016 | Miyoshi |
| 2017/0018050 | A1* | 1/2017 | Roy ........................ G06F 12/04 |
| 2017/0024221 | A1 | 1/2017 | He et al. |
| 2019/0007280 | A1* | 1/2019 | Sarangam ............ H04L 41/5003 |
| 2019/0158429 | A1* | 5/2019 | Friedman .............. H04L 49/254 |

FOREIGN PATENT DOCUMENTS

| | | | |
|---|---|---|---|
| CN | 102124525 | A | 7/2011 |
| CN | 102999610 | A | 3/2013 |
| CN | 103414535 | A | 11/2013 |
| CN | 104428793 | A | 3/2015 |
| CN | 105765525 | A | 7/2016 |
| CN | 106030526 | A | 10/2016 |
| CN | 106301859 | A | 1/2017 |
| CN | 106612306 | A | 5/2017 |
| CN | 106663024 | A | 5/2017 |

\* cited by examiner

DATA ACCESS METHOD AND APPARATUS

CROSS-REFERENCE TO RELATED APPLICATIONS

This is a continuation of Int'l Patent App. No. PCT/CN2017/103203 filed on Sep. 25, 2017, which is incorporated by reference.

TECHNICAL FIELD

The present disclosure relates to the field of information technologies, and in particular, to a data access method and apparatus.

BACKGROUND

A virtual machine running on a host has a virtual machine network interface card. During virtual machine communication, a physical network interface card needs to use a descriptor of the virtual machine network interface card. The descriptor needs to be generated by a driver of the physical network interface card. Therefore, the driver of the physical network interface card needs to be installed on the virtual machine. In this way, different physical network interface card suppliers need to develop different physical network interface card drivers for different virtual machine operating systems. Users need to install a corresponding physical network interface card driver for a virtual machine operating system. Otherwise, a physical network interface card cannot access data on a virtual machine.

SUMMARY

This disclosure provides a data access method, a host, a non-volatile computer readable storage medium, and a data access apparatus. In this disclosure, if a driver of a physical interface card is not installed on a virtual machine running on a host, the physical interface card of the host can still access data on the virtual machine.

A first aspect of this disclosure provides a data access method. The method is applied to a host. The host includes a processor, a memory, and a physical interface card, a virtual machine runs on the host, and the virtual machine includes a virtual machine interface card. The processor obtains, from the memory, a first descriptor including a virtual machine physical memory address and a data length of accessible data. The virtual machine physical memory address points to a start location at which the accessible data is stored in a physical memory of the virtual machine. In addition, the first descriptor is encoded in a coding mode that can be recognized by the virtual machine interface card. The processor further converts the first descriptor to a second descriptor that is encoded in a coding mode that can be recognized by the physical interface card. The physical interface card obtains, based on the second descriptor, a physical address that is in the memory and to which the virtual machine physical memory address is mapped, and accesses the accessible data according to the physical address in the memory.

For example, the physical interface card may be a network interface card, or referred to as a NIC, and the corresponding virtual machine interface card is a virtual machine network interface card. The physical interface card may be a host bus adaptor (HBA) card, and the corresponding virtual machine interface card is a virtual machine HBA card. The first descriptor is encoded in the coding mode that can be recognized by the virtual machine interface card and cannot be recognized by the physical interface card. The processor of the host converts the first descriptor to the second descriptor. Because the second descriptor is encoded in the coding mode that can be recognized by the physical interface card, the physical interface card may obtain, based on the second descriptor, the physical address that is in the memory and to which the virtual machine physical memory address is mapped, to access data. In view of the above, in this disclosure, the physical interface card can access data on the virtual machine without a need of installing a driver of the physical interface card on the virtual machine. This improves efficiency in creating a virtual machine.

With reference to the first aspect, in a first possible implementation of the first aspect, the memory stores a virtual queue of the virtual machine interface card and a physical queue of the physical interface card, the first descriptor is saved in the virtual queue, and there is a correspondence between the virtual queue and the physical queue. The processor further saves the second descriptor into the physical queue according to the correspondence. The first descriptor and the second descriptor are respectively saved in the virtual queue and the physical queue, so that the processor can obtain the first descriptor by using the virtual queue, and the physical interface card can obtain the second descriptor by using the physical queue. This helps the host manage the first descriptor and the second descriptor and improves the efficiency.

With reference to the first possible implementation of the first aspect, in a second possible implementation of the first aspect, the correspondence is saved in a first storage space in the memory and the first storage space belongs to a system memory in the memory. Only the host has access permission on the system memory in the memory, and the virtual machine running on the host does not have the access permission on the system memory. The first storage space cannot be accessed by the virtual machine. The correspondence is saved in the system memory in the memory, and therefore the processor can quickly access the correspondence. This improves data access efficiency.

With reference to the second possible implementation of the first aspect, in a third possible implementation of the first aspect, the second descriptor includes the virtual machine physical memory address and the data length. In this method, the physical interface card sends a query message to a memory management unit, so as to query the physical address that is in the memory and to which the virtual machine physical memory address is mapped. The query message includes the virtual machine physical memory address. The memory management unit queries, based on the virtual machine physical memory address included in the query message, a mapping relationship between the virtual machine physical memory address and the physical address in the memory, to obtain the physical address in the memory. The memory management unit sends the physical address in the memory to the physical interface card. Through the memory management unit, the physical interface card can use the virtual machine physical memory address to access data. This reduces participation of the processor and saves computing resources.

With reference to the first aspect, and the second and the third possible implementations of the first aspect, in a fourth possible implementation of the first aspect, the converting, by the processor, the first descriptor to a second descriptor specifically includes: obtaining, by the processor, the virtual machine physical memory address based on the first descriptor; mapping, by the processor, the virtual machine physical memory address to the physical address in the memory; and encoding, by the processor, the physical address in the memory and the data length to obtain the second descriptor, where the second descriptor includes the physical address in the memory and the data length. The second descriptor includes the physical address that is in the memory and to which the virtual machine physical memory address is mapped, so that a physical network interface card can directly access data according to the physical address in the memory in the second descriptor.

With reference to the first possible implementation of the first aspect, in a fifth possible implementation of the first aspect, the virtual queue includes a virtual sending queue, the physical queue includes a physical sending queue, the accessible data is to-be-sent data, and the first descriptor is saved in the virtual sending queue. The saving, by the processor, the second descriptor into the physical queue includes: saving the second descriptor into the physical sending queue. In this case, the first descriptor is a first to-be-sent data descriptor, and the second descriptor is a second to-be-received data descriptor.

With reference to the first possible implementation of the first aspect, in a sixth possible implementation of the first aspect, the virtual queue includes a virtual receiving queue, the physical queue includes a physical receiving queue, the accessible data is to-be-received data, and the first descriptor is saved in the virtual receiving queue. The saving, by the processor, the second descriptor into the physical queue includes: saving the second descriptor into the physical receiving queue. In this case, the first descriptor is a first idle descriptor, and the second descriptor is a second idle descriptor.

A second aspect of this disclosure provides a host. The host includes a processor, a storage device, and a physical interface card. The host is configured to run a virtual machine, and the virtual machine includes a virtual machine interface card. The processor is configured to obtain a first descriptor including a virtual machine physical memory address and a data length of accessible data. The virtual machine physical memory address points to a start location at which the accessible data is stored on the virtual machine. In addition, the first descriptor is encoded in a coding mode that can be recognized by the virtual machine interface card. The processor is further configured to convert the first descriptor to a second descriptor that is encoded in a coding mode that can be recognized by the physical interface card. The physical interface card is configured to obtain, based on the second descriptor, a physical address that is in a memory and to which the virtual machine physical memory address is mapped, and access the accessible data on the virtual machine according to the physical address in the memory.

The first descriptor is encoded in the coding mode that can be recognized by the virtual machine interface card and cannot be recognized by the physical interface card. The processor of the host converts the first descriptor to the second descriptor. Because the second descriptor is encoded in the coding mode that can be recognized by the physical interface card, the physical interface card may obtain, based on the second descriptor, the physical address that is in the memory and to which the virtual machine physical memory address is mapped, to access data. In view of the above, in this embodiment, the physical interface card can access data on the virtual machine without a need of installing a driver of the physical interface card on the virtual machine.

With reference to the second aspect, in a first possible implementation of the second aspect, the memory in the storage device stores a virtual queue of the virtual machine interface card and a physical queue of the physical interface card, the first descriptor is saved in the virtual queue, and there is a correspondence between the virtual queue and the physical queue. The processor is further configured to save the second descriptor into the physical queue according to the correspondence. The physical interface card is configured to obtain the second descriptor from the physical queue. The virtual queue and the physical queue allow the processor and the physical interface card to respectively obtain the first descriptor and the second descriptor through queue communication.

With reference to the first possible implementation of the second aspect, in a second possible implementation of the second aspect, the correspondence is saved in a first storage space in the memory, namely, a system memory in the memory. The first storage space cannot be accessed by the virtual machine. The correspondence is saved in the system memory in the memory, and therefore the processor can quickly access the correspondence. This improves data access efficiency.

With reference to the second possible implementation of the second aspect, in a third possible implementation of the second aspect, the second descriptor includes the virtual machine physical memory address and the data length. The physical interface card is configured to perform the following operations: sending, by the physical interface card, a query message to a memory management unit, so as to query the physical address that is in the memory and to which the virtual machine physical memory address is mapped. The query message includes the virtual machine physical memory address. Through the memory management unit, the physical interface card can use the virtual machine physical memory address to quickly access data.

With reference to the method in the second aspect, and the second and third possible implementations of the second aspect, in a fourth possible implementation of the second aspect, that the processor is configured to convert the first descriptor to a second descriptor specifically includes: obtaining the virtual machine physical memory address based on the first descriptor; mapping the virtual machine physical memory address to the physical address in the memory; and encoding the physical address in the memory and the data length to obtain the second descriptor. The second descriptor includes the physical address in the memory and the data length. The second descriptor includes the physical address that is in the memory and to which the virtual machine physical memory address is mapped, so that a physical network interface card can directly access data according to the physical address in the memory.

With reference to the first possible implementation of the second aspect, in a fifth possible implementation of the second aspect, the virtual queue includes a virtual sending queue, the physical queue includes a physical sending queue, the accessible data is to-be-sent data, and the first descriptor is saved in the virtual sending queue. That the processor is configured to save the second descriptor into the physical queue specifically includes: saving the second descriptor into the physical sending queue. In this case, the first descriptor is a first to-be-sent data descriptor, and the second descriptor is a second to-be-received data descriptor.

With reference to the first possible implementation of the second aspect, in a sixth possible implementation of the second aspect, the virtual queue includes a virtual receiving queue, the physical queue includes a physical receiving queue, the accessible data is to-be-received data, and the first descriptor is saved in the virtual receiving queue. That the processor is configured to save the second descriptor into the physical queue specifically includes: saving the second descriptor into the physical receiving queue. In this case, the first descriptor is a first idle descriptor, and the second descriptor is a second idle descriptor.

A third aspect of this disclosure further provides a data access apparatus. The apparatus is applied to a host. The host includes a processor, a memory, and a physical interface card, a virtual machine runs on the host, and the virtual machine includes a virtual machine interface card. The processor obtains a first descriptor including a virtual machine physical memory address and a data length of accessible data. The virtual machine physical memory address points to a start location at which the accessible data is stored on the virtual machine. In addition, the first descriptor is encoded in a coding mode that can be recognized by the virtual machine interface card. The processor further converts the first descriptor to a second descriptor that is encoded in a coding mode that can be recognized by the physical interface card, so that the physical interface card obtains, based on the second descriptor, a physical address that is in the memory and to which the virtual machine physical memory address is mapped, to access the accessible data on the virtual machine.

Likewise, the first descriptor is encoded in the coding mode that can be recognized by the virtual machine interface card and cannot be recognized by the physical interface card. The processor of the host converts the first descriptor to the second descriptor. Because the second descriptor is encoded in the coding mode that can be recognized by the physical interface card, the physical interface card may obtain, based on the second descriptor, the physical address that is in the memory and to which the virtual machine physical memory address is mapped, to access data. In view of the above, in this embodiment, the physical interface card can access data on the virtual machine without a need of installing a driver of the physical interface card on the virtual machine. Therefore, the apparatus in this embodiment resolves a problem that a user needs to install a corresponding physical network interface card driver based on an operating system of a virtual machine, so that a physical network interface card can access data.

With reference to the third aspect, in a first possible implementation of the third aspect, the memory stores a virtual queue of the virtual machine interface card and a physical queue of the physical interface card, the first descriptor is saved in the virtual queue, and there is a correspondence between the virtual queue and the physical queue. The apparatus further comprises a storage unit. The storage unit is configured to save the second descriptor into the physical queue according to the correspondence, so that the physical interface card can obtain the second descriptor from the physical queue. The virtual queue and the physical queue allow the processor and the physical interface card to respectively obtain the first descriptor and the second descriptor through queue communication.

With reference to the first possible implementation of the third aspect, in a second possible implementation of the third aspect, the correspondence is saved in a first storage space in the memory, namely, a system memory in the memory. The first storage space cannot be accessed by the virtual machine. The correspondence is saved in the system memory in the memory, and therefore the processor can quickly access the correspondence. This improves data access efficiency.

With reference to the apparatus in the third aspect, and the second and third possible implementations of the third aspect, in a fourth possible implementation of the third aspect, that the processor is configured to convert the first descriptor to a second descriptor specifically includes: obtaining the virtual machine physical memory address based on the first descriptor; mapping the virtual machine physical memory address to the physical address in the memory; and encoding the physical address in the memory and the data length to obtain the second descriptor. The second descriptor includes the physical address in the memory and the data length. The second descriptor includes the physical address that is in the memory and to which the virtual machine physical memory address is mapped, so that a physical network interface card can directly access data according to the physical address in the memory.

With reference to the first possible implementation of the third aspect, in a fourth possible implementation of the third aspect, the accessible data is to-be-sent data, the virtual queue includes a virtual sending queue, the first descriptor is saved in the virtual sending queue, and the physical queue includes a physical sending queue. That the storage unit is configured to save the second descriptor into the physical queue, so that the physical interface card can obtain the second descriptor from the physical queue specifically includes: saving the second descriptor into the physical sending queue, so that the physical interface card can obtain the second descriptor from the physical sending queue. In this case, the first descriptor is a first to-be-sent data descriptor, and the second descriptor is a second to-be-received data descriptor.

With reference to the first possible implementation of the third aspect, in a fifth possible implementation of the third aspect, the virtual queue includes a virtual receiving queue, the physical queue includes a physical receiving queue, the accessible data is to-be-received data, and the first descriptor is saved in the virtual receiving queue. That the physical interface card is configured to save the second descriptor into the physical queue specifically includes: saving the second descriptor into the physical receiving queue. In this case, the first descriptor is a first idle descriptor, and the second descriptor is a second idle descriptor.

A fourth aspect of this disclosure further provides a non-volatile computer readable storage medium. The non-volatile readable storage medium includes a computer instruction. The computer instruction is used to execute an operation performed by the processor in any one of the first aspect of the embodiments and the first to the seventh possible implementations of the first aspect.

A fifth aspect of this disclosure further provides a computer program product. The computer program product includes a computer instruction. A processor of a host executes the computer instruction to execute an operation performed by the processor in any one of the first aspect of the embodiments and the first to seventh possible implementations of the first aspect.

DESCRIPTION OF EMBODIMENTS

Figure 1:
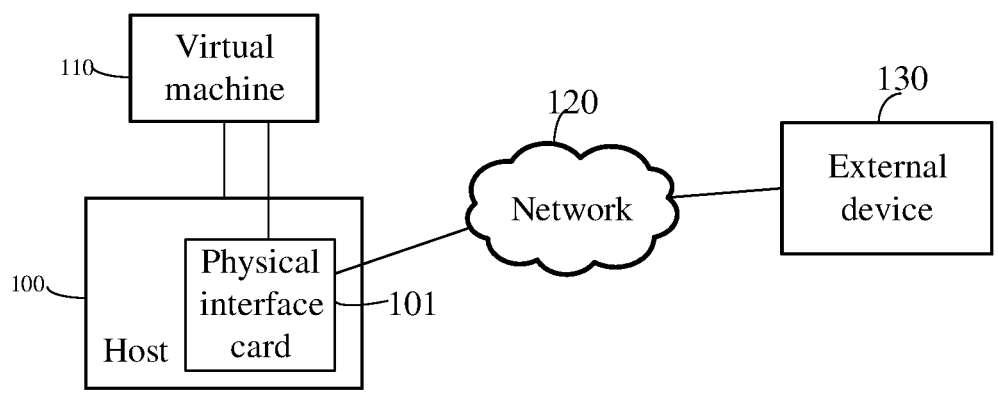
FIG. 1 is a schematic diagram in which a physical network interface card accesses data.

A host, as a carrier for running a virtual machine, usually includes a processor, a memory, and a physical interface card. When the virtual machine communicates with an external device of the host, the physical interface card accesses the virtual machine, for example, obtains data sent by the virtual machine, or sends data sent by the external device to the virtual machine to the virtual machine. The host in this embodiment is also referred to as a server. The virtual machine running on the host communicates with the external device. As shown in FIG. 1, a physical interface card 101 communicates with an external device 130 by using a network 120. In the figure, the network 120 may be a wired or wireless network, and the external device 130 may be a server, a terminal device, a network device, or the like. The physical interface card 101 may be a physical network interface card (also simply referred to as a network interface card), or may be a HBA card, or the like. A virtual machine interface card corresponding to the physical network interface card is a virtual machine network interface card.

Figure 2:
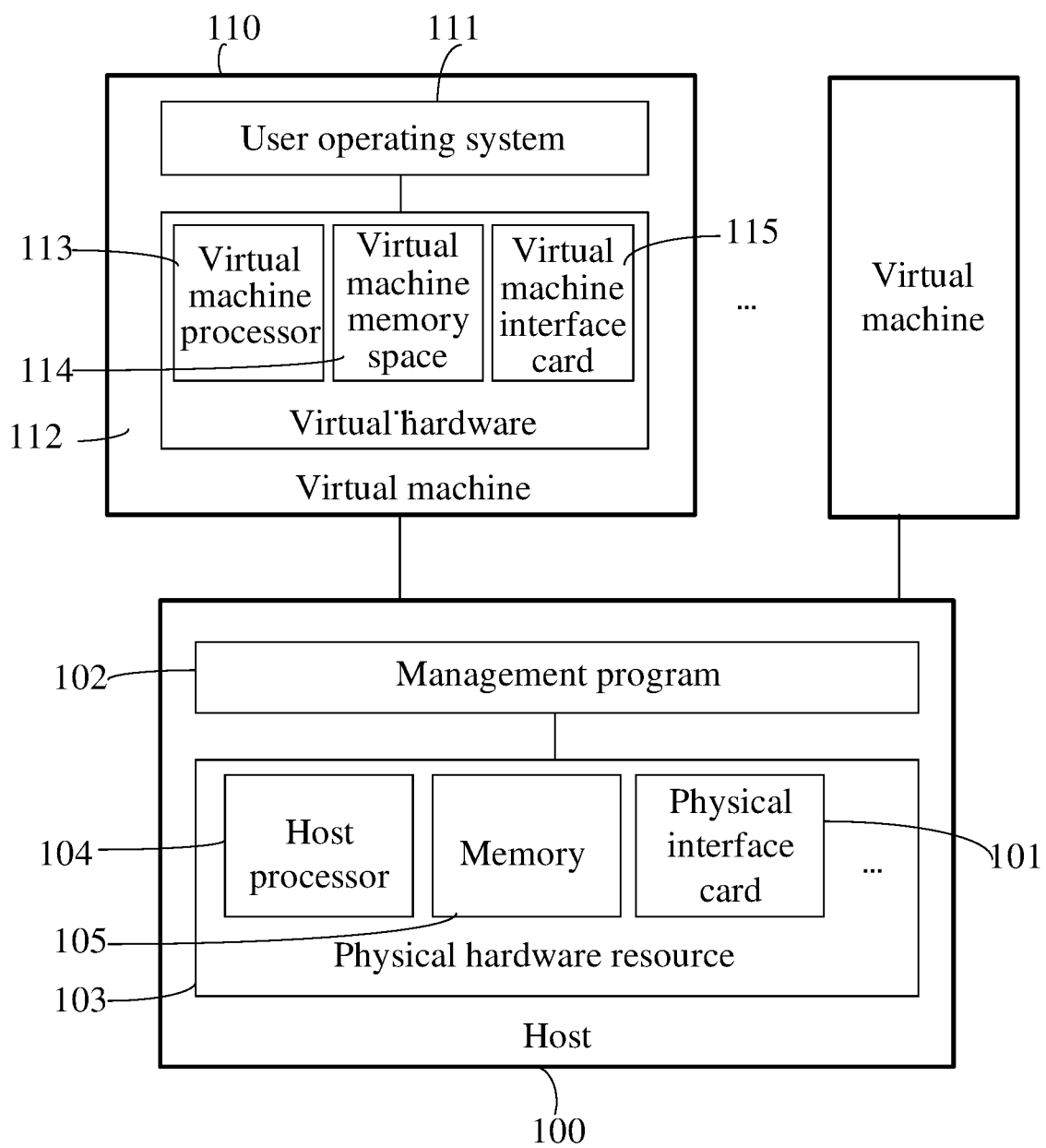
FIG. 2 is a diagram of an architecture of a host, a physical interface card, and a virtual machine.

FIG. 2 shows an architecture of a host 100, the physical interface card 101, and a virtual machine 110 in FIG. 1. A plurality of virtual machines runs on the host 100. An architecture of the host 100 and the plurality of virtual machines may be full virtualized, semi-virtualized, or hardware-virtualized. The following uses one virtual machine 110 as an example. The host 100 includes a physical management program 102 and a physical hardware resource 103. The physical hardware resource 103 includes a processor 104, a memory 105, the physical interface card 101, and the like. In this embodiment, an operating system of the virtual machine 110 is a user operating system 111, and hardware of the virtual machine 110 is referred to as virtual hardware 112. The virtual hardware 112 includes but is not limited to a virtual machine processor 113, a virtual memory space 114, a virtual machine interface card 115, and the like. The processor of the host 100 may be a central processing unit (CPU), or may be an application-specific integrated circuit (ASIC), a field-programmable gate array (FPGA), another programmable logic device, a transistor logic device, a hardware component, or any combination thereof. The management program 102 is also referred to as a virtual machine monitor (VMM), for example, a Hypervisor, or may be a kernel-based virtual machine (KVM), Xen, or Denali.

The virtual machine 110 runs on the management program 102 of the host 100, and the management program 102 performs scheduling for the virtual hardware 112 of the virtual machine 110 and the physical hardware resource 103 of the host 100. The following uses a Hypervisor as an example. Specifically, a Hypervisor 106 virtualizes some physical hardware resources 103 used by the virtual machine 110 into the virtual hardware 112, and provides a running hardware environment for the user operating system 111 of the virtual machine 110. The Hypervisor 106 coordinates access by each virtual machine to the physical hardware resource 103.

Figure 3A:
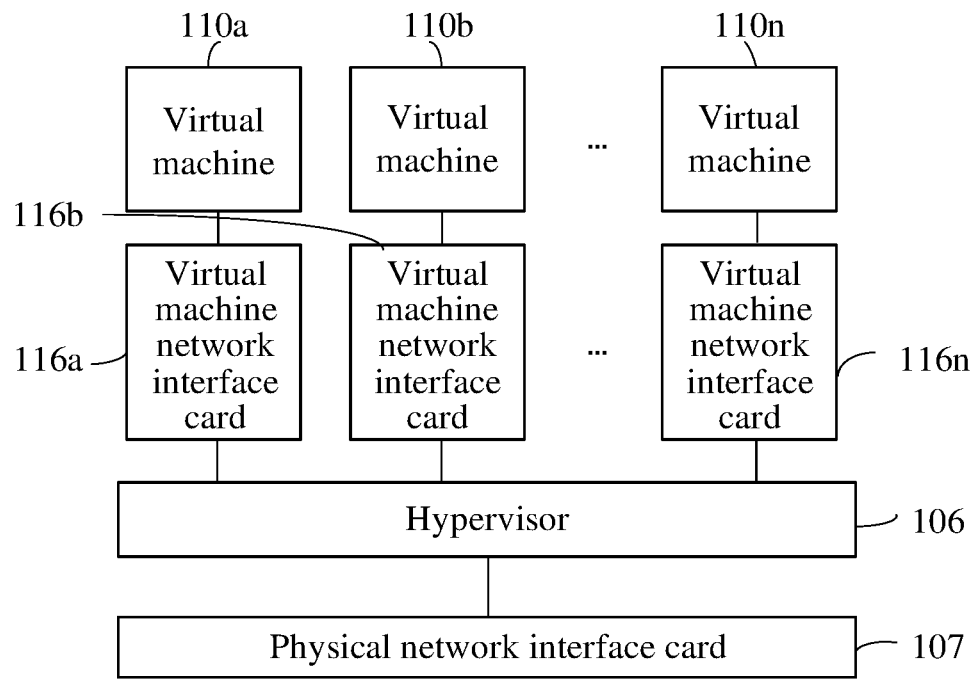
FIG. 3A is a schematic diagram of allocating a physical network interface card to a virtual machine by a Hypervisor.
Figure 3B:
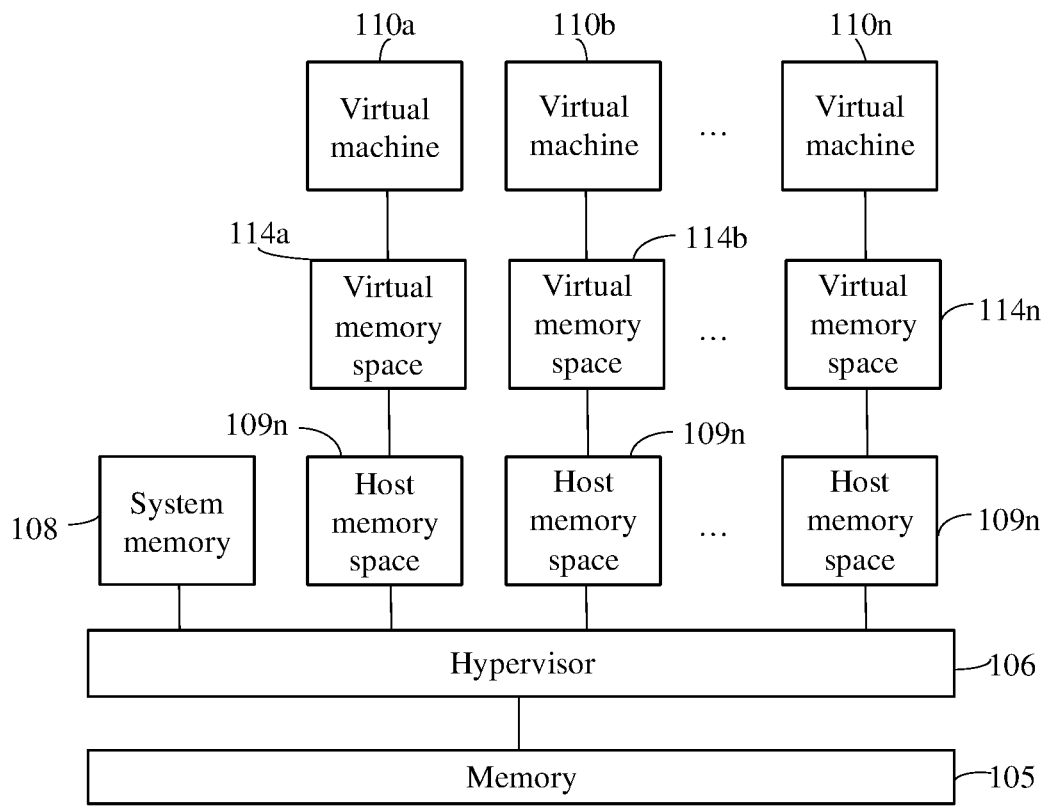
FIG. 3B is a schematic diagram of allocating a memory to a virtual machine by a Hypervisor.

In this embodiment, the physical interface card being a physical network interface card is used as an example. FIG. 3A and FIG. 3B are respectively schematic diagrams of allocating a physical network interface card 107 and the memory 105 to the virtual machine by the Hypervisor 106. During specific implementation, the processor 104 executes the management program 102 to implement a corresponding operation in this embodiment. Therefore, an operation performed by the management program 102 (for example, the Hypervisor 106) mentioned in the following description of this embodiment has a same meaning as a corresponding function of the management program 102 executed by the processor 104. For example, the Hypervisor 106 allocates the physical network interface card 107 and the memory 105 to the virtual machine 110, or the processor 104 allocates the physical network interface card 107 and the memory 105 to the virtual machine 110. The foregoing two expressions have a same meaning.

The Hypervisor 106 virtualizes the physical network interface card 107 into one or more virtual machine network interface cards and allocates the one or more virtual machine network interface cards to the virtual machines on the host 100. As shown in FIG. 3A, the Hypervisor 106 virtualizes the physical network interface card 107 into a virtual machine network interface card 116*a*, a virtual machine network interface card 116*b*, . . . and a virtual machine network interface card 116*n*, and allocates them to a corresponding virtual machine 110*a*, a corresponding virtual machine 110*b*, . . . and a corresponding virtual machine 110*n*. This embodiment uses an example in which one virtual machine includes one virtual machine network interface card, but during specific implementation, one virtual machine may include a plurality of virtual machine network interface cards. This is not limited in this embodiment. An implementation that the physical network interface card 107 is virtualized into a virtual machine network interface card 116 is as follows: The Hypervisor 106 virtualizes a Peripheral Component Interconnect Express (PCIe) network interface card into a plurality of virtual functions (VFs) by using a single root-input/output virtualization (SR-IOV) technology, and allocates the VFs to the corresponding virtual machines.

The Hypervisor 106 virtualizes the memory 105 and allocates it to one or one virtual machines on the host 100. As shown in FIG. 3B, the Hypervisor 106 divides memory spaces of the memory 105 into a system memory 108, a host memory space 109*a*, a host memory space 109*b*, . . . and a host memory space 109*n*. The system memory 108 is a memory space in which the Hypervisor 106 and the like are running. Only the host has access permission to access the system memory 108, and a virtual machine running on the host does not have access permission on the system memory 108. Therefore, the system memory 108 cannot be accessed by the virtual machine 110*a*, the virtual machine 110*b*, . . . or the virtual machine 110*n*. The Hypervisor 106 maps the host memory space 109*a* to a virtual memory space 114*a*, the host memory space 109*b* to a virtual memory space 114*b*, . . . and maps the host memory space 109*n* to a virtual memory space 114*n*, and allocates the virtual memory space 114*a* to the virtual machine 110*a*, the virtual memory space 114*b* to the virtual machine 110*b*, . . . and the virtual memory space 114*n* to the virtual machine 110*n*. The virtual machine 110 accesses a virtual memory space 114 by using a virtual machine physical memory address, and the host 100 accesses the memory 105 by using a physical address in the memory 105. Because virtual storage spaces 114*a* to 114*n* are respectively mapped to the host storage spaces 109*a* to 109n, the Hypervisor 106 maps the virtual machine physical memory address to the physical address in the memory 105.

Figure 4:
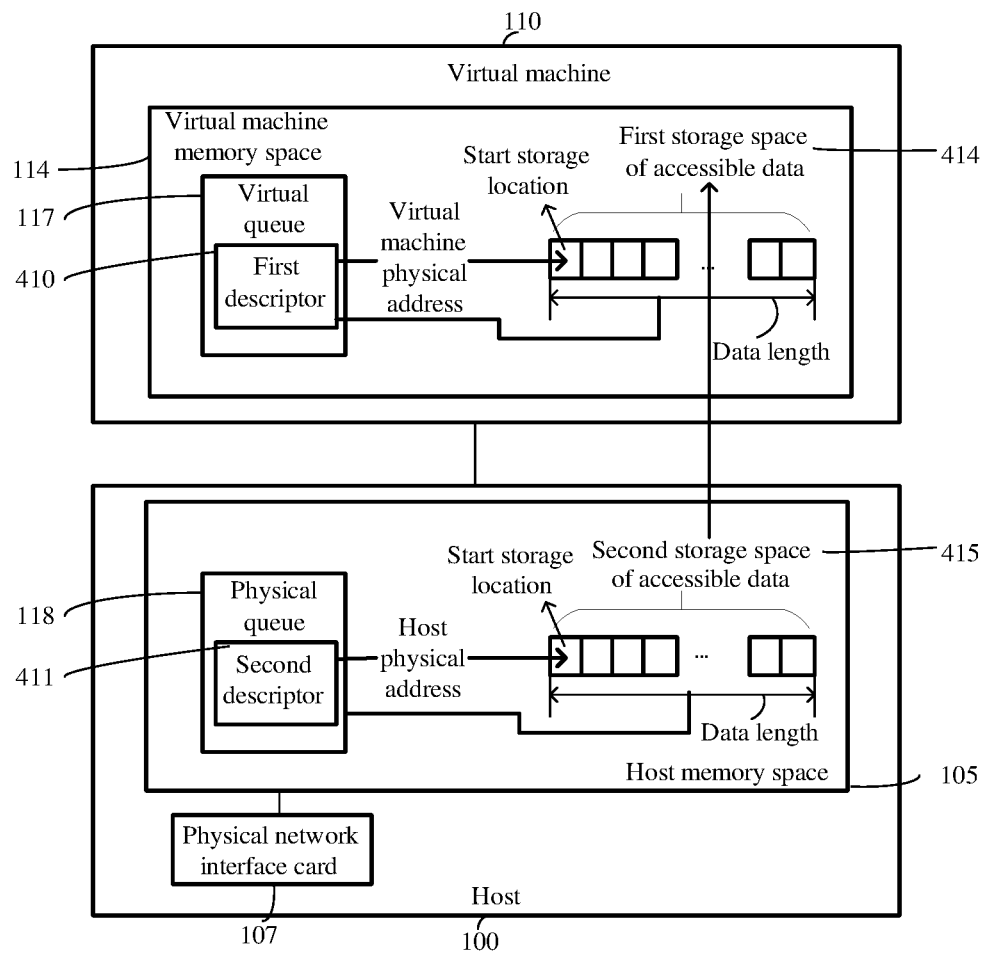
FIG. 4 is a schematic diagram of a descriptor, a virtual queue, a physical queue, and accessible data.

In this embodiment, the physical network interface card 107 implements data access by using a descriptor. As shown in FIG. 4, a physical queue 413 is generated by a driver of the physical network interface card 107, and is used to store a descriptor. The physical network interface card 107 obtains the descriptor from the physical queue 413, and accesses a first storage space of accessible data according to location information of the accessible data in the descriptor. A first descriptor 410 in FIG. 4 is generated by a driver of the virtual machine network interface card 116 and stored in a virtual queue 117 of the virtual machine network interface card 116. The virtual queue 117 is also generated by the driver of the virtual machine network interface card 116, and the virtual queue 117 is located in the virtual memory space 114 allocated by the Hypervisor 106 to the virtual machine 110. The driver of the virtual machine network interface card may be a VirtIO driver. The physical queue 413 corresponds to the virtual queue 117, and a correspondence between the physical queue 413 and the virtual queue 117 is stored in the memory 105. The correspondence may be stored in a form of a data table or another data structure, and this is not limited in this embodiment. The accessible data that can be accessed by the physical network interface card 107 when the physical network interface card 107 accesses data on the virtual machine 110 is stored in a first storage space 414 in the virtual memory space 114. It can be learned from the above that the virtual memory space 114 provides a virtual machine physical memory for the virtual machine 110 and is mapped to a part of storage space in the memory 105. A virtual machine physical memory address that points to a start storage location of the first storage space 414 corresponds to the physical address in the memory 105, and the physical address in the memory 105 is a start storage location of a second storage space 415.

Figure 5:
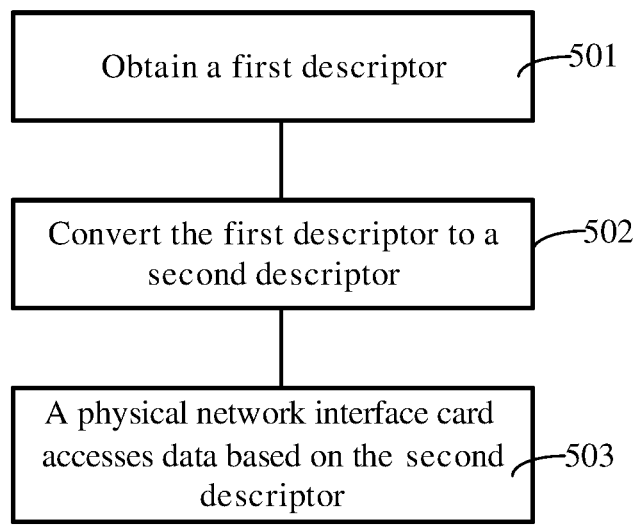
FIG. 5 is a flowchart of a data access method.

FIG. 5 shows a data access process, which is specifically as follows:

501: Obtain the first descriptor 410.

Specifically, the Hypervisor 106 obtains the first descriptor 410 from the virtual queue 117. The first descriptor 410 is included in the first storage space 414, of the virtual memory space 114, that stores the accessible data. The first storage space 414 is equivalent to the virtual machine physical memory address and a data length of the accessible data. The virtual machine physical memory address points to a start location at which the accessible data is stored in the first storage space 414 (a physical memory of the virtual machine 110). Because the first descriptor 410 is generated by the driver of the virtual machine network interface card 116, the first descriptor 410 is encoded in a coding mode that can be recognized by the virtual machine network interface card, and the physical network interface card 107 cannot recognize the coding mode of the first descriptor 410. The physical memory of the virtual machine 110 refers to a virtual hardware memory used by a guest operating system on the virtual machine 110. The physical memory of the memory 105 in the host 100 is an actual physical memory in the host 100, and the physical address in the memory 105 points to the actual physical memory in the host 100.

502. The Hypervisor 106 converts the first descriptor 410 to a second descriptor 411, where the second descriptor 411 is encoded in a coding mode that can be recognized by the physical network interface card 107.

In this case, the physical network interface card 107 obtains the second descriptor 411 that can be recognized from the physical queue 413. In other words, the driver of the physical network interface card 107 does not need to be installed on the virtual machine 110, and the physical network interface card 107 can access the first storage space 414 of the virtual machine 110. Because the driver of the virtual machine network interface card 116 is usually integrated into the user operating system 111 on the virtual machine 110, in this embodiment, when software and hardware environments for communication of the virtual machine 110 are being created, the driver of the physical network interface card 107 does not need to be installed on the virtual machine 110. This resolves a problem that it is inconvenient for a user to use when the driver of the physical interface card 101 is installed on the virtual machine 110, increases efficiency in creating the virtual machine 110, and improves user experience of the virtual machine 110.

When the host 100 has a memory management unit (e.g., input/output memory management unit (IOMMU)), and the physical network interface card 107 has a direct memory access (DMA) function, the Hypervisor 106 converts the first descriptor 410 to the second descriptor 411. A specific process is as follows: The Hypervisor 106 obtains the virtual machine physical memory address and the data length of the accessible data based on the first descriptor 410 and the coding mode of the virtual machine network interface card 116, and encodes the virtual machine physical memory address and the data length of the accessible data into the second descriptor 411 according to the coding mode that can be recognized by the physical network interface card 107. Specifically, the physical network interface card 107 may be a PCIe network interface card. The PCIe network interface card has a DMA function. Based on the virtualization technology for directed input/output (VT-d) of an Intel® CPU and the IOMMU in the management program, the PCIe network interface card may generate a DMA command by using the virtual machine physical memory address, and access the virtual memory space. This reduces participation of the processor and saves computing resources of the processor.

When the host 100 does not have the IOMMU, or the physical network interface card 107 does not have the DMA function, after obtaining the virtual machine physical memory address and the data length of the accessible data based on the first descriptor 410 and the coding mode of the virtual machine network interface card 116, the Hypervisor 106 converts the virtual machine physical memory address to the corresponding physical address in the memory 105, and encodes the physical address in the memory 105 and the data length of the accessible data into the second descriptor 411 according to the coding mode that can be recognized by the physical network interface card 107, so that the physical network interface card 107 can directly access data according to the physical address in the memory 105 in the second descriptor 411. This increases a data access speed. The physical network interface card 107 may be a non-PCIe physical interface card that does not have a DMA function. A Peripheral Component Interconnect (PCI) card is an embodiment of a non-PCIe card.

Figure 6A:
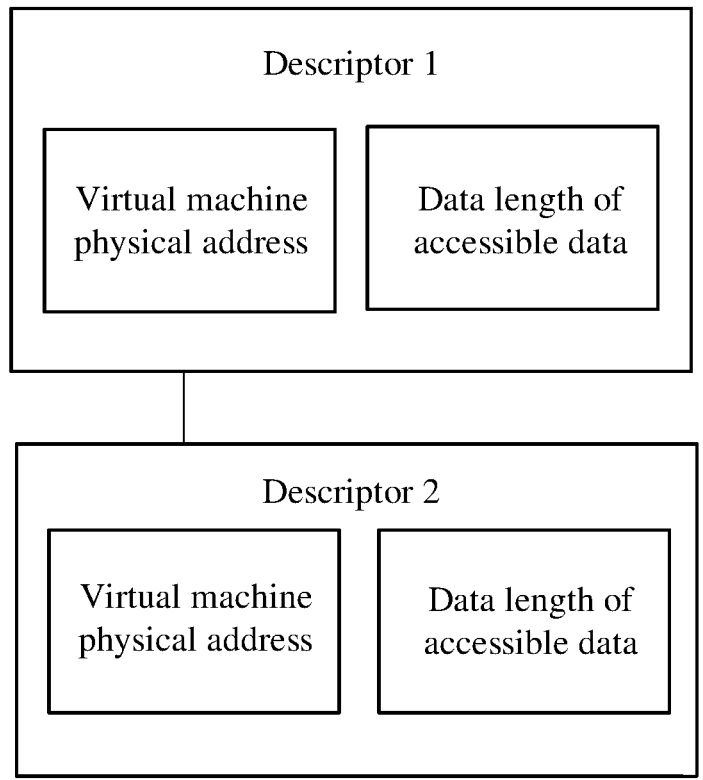
FIG. 6A is a schematic diagram of a first implementation of descriptor conversion.

FIG. 6A is a schematic diagram of a process in which the first descriptor 410 is converted to the second descriptor 411 when the host 100 has the IOMMU and the physical network interface card 107 has the DMA function. The Hypervisor 106 encodes the virtual machine physical memory address and the data length of the accessible data according to the coding mode that can be recognized by the physical network interface card 107.

Figure 6B:
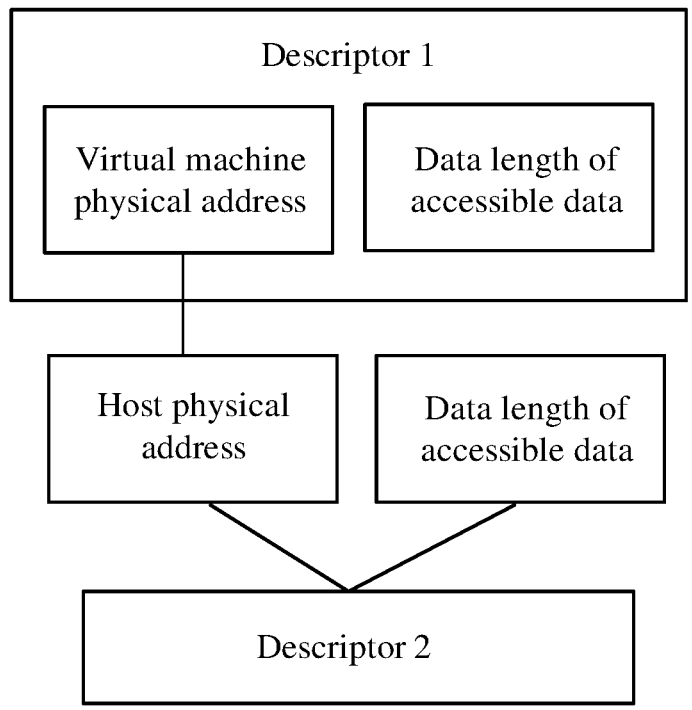
FIG. 6B is a schematic diagram of a second implementation of descriptor conversion.

FIG. 6B is a schematic diagram of a process in which the first descriptor 410 is converted to the second descriptor 411 when the host 100 does not have the IOMMU or the physical network interface card 107 does not have the DMA function. The Hypervisor 106 converts the virtual machine physical memory address to the corresponding physical address in the memory 105, and encodes the physical address in the memory 105 and the data length of the accessible data according to the coding mode that can be recognized by the physical network interface card 107.

503: The physical network interface card 107 accesses, based on the second descriptor 411, the second storage space 415 that stores the accessible data.

When the host 100 has the IOMMU and the physical network interface card 107 has the DMA function, the second descriptor 411 obtained by the physical network interface card 107 from the physical queue 413 includes the virtual machine physical memory address and the data length of the accessible data. The physical network interface card 107 sends, based on the DMA function of the physical network interface card 107, a query message that carries the virtual machine physical memory address to the IOMMU in the host 100, to query the physical address, corresponding to the virtual machine physical memory address, in the memory 105. The IOMMU returns a message carrying the physical address in the memory 105 to the physical network interface card 107, and the physical network interface card 107 generates a direct access command according to the physical address in the memory 105. The physical address in the memory 105 points to the start storage location of the second storage space 415. The physical network interface card 107 accesses the storage space of the accessible data according to the physical address in the memory 105 and the data length of the accessible data, to implement communication with the virtual machine 110. Likewise, in this case, the physical network interface card 107 may be a PCIe network interface card.

When the host 100 does not have the IOMMU or the physical network interface card 107 does not have the DMA function, the second descriptor 411 obtained by the physical network interface card 107 from the physical queue 413 includes the physical address that is in the memory 105 and to which the virtual machine physical memory address is mapped and the data length of the accessible data. The physical address in the memory of the host points to the start storage location of the second storage space 415. The physical network interface card 107 accesses the storage space of the accessible data according to the physical address in the memory 105 and the data length of the accessible data in the second descriptor 411, to implement communication with the virtual machine 110. Likewise, the physical network interface card 107 may be a non-PCIe physical interface card that does not have a DMA function. A (PCI card is an example of a non-PCIe card.

Optionally, the physical network interface card 107 may read the second descriptor 411 from the physical queue 413 by polling the physical queue 413. When the second descriptor 411 is saved in the physical queue 413, the Hypervisor 106 may also send an interrupt to the physical network interface card 107, so as to trigger the physical network interface card 107 to read the second descriptor 411 from the physical queue 413.

In another embodiment, on the host 100, the virtual machine 110, and another logical or physical component shown in FIG. 2, FIG. 3A, and FIG. 3B, when the physical network interface card 107 creates a physical queue 118 that stores the second descriptor 411 shown in FIG. 4, the physical queue 118 is stored in the virtual memory space 114, which is a storage space that cannot be sensed by the virtual machine 110. In other words, the storage space that cannot be sensed by the virtual machine 110 is a part of the virtual memory space 114 that is allocated by the Hypervisor 106 to the virtual machine 110, but is not notified to the virtual machine 110. Because the Hypervisor 106 does not notify the virtual machine 110 of the memory space, the virtual machine 110 does not occupy the memory space, and the memory space can be used to store the physical queue 118. In this case, a process of a method for accessing data on the virtual machine 110 by the physical network interface card 107 is also the same as the foregoing process 401 to 403, and details are not described herein again. The virtual memory space 114 is mapped to a segment of space in the memory 105, namely, the physical queue 118 is actually stored in the segment of space in the memory 105. In this embodiment, the virtual memory space is formed by the virtual machine physical memory address and a segment of address length. Likewise, a segment of space in the memory 105 to which the virtual memory space is mapped is formed by the physical address in the memory 105 to which the virtual machine physical memory address is mapped and a length of the segment.

When the virtual machine 110 sends to-be-sent data to the external device 130, the physical network interface card 107 needs to access the to-be-sent data on the virtual machine 110.

In this case, the virtual queue 117 generated by the driver of the virtual machine network interface card 116 is a virtual sending queue, and a to-be-sent data descriptor 1 is stored in the virtual sending queue. The physical queue 413 generated by the driver of the physical network interface card 107 is a physical sending queue, and the correspondence between the virtual queue 117 and the physical queue 413 is a correspondence between the virtual sending queue and the physical sending queue. A process of sending the to-be-sent data by the virtual machine 110 to the physical network interface card 107 is as follows:

Step 1: The Hypervisor 106 obtains the to-be-sent data descriptor 1 from the virtual sending queue.

The to-be-sent data descriptor 1 is included in a third storage space (a physical memory of the virtual machine), that stores the to-be-sent data, in the virtual memory space 114. The third storage space is equivalent to a virtual machine physical memory address 1 and a data length of the to-be-sent data. The virtual machine physical memory address 1 points to a start location at which the to-be-sent data is stored in the third storage space (the physical memory of the virtual machine). The to-be-sent data descriptor 1 generated by the driver of the virtual machine network interface card 116 is encoded according to the coding mode that can be recognized by the virtual machine network interface card 116.

Step 2: When the host 100 has the IOMMU and the physical network interface card 107 has the DMA function, the Hypervisor 106 obtains the virtual machine physical memory address 1 and the data length of the to-be-sent data based on the to-be-sent data descriptor 1 and the coding mode of the virtual machine network interface card 116, and encodes, according to the coding mode that can be recognized by the physical network interface card 107, the virtual machine physical memory address 1 and the data length of the to-be-sent data into a to-be-sent data descriptor 2.

When the host 100 does not have the IOMMU or the physical network interface card 107 does not have the DMA function, the Hypervisor 106 obtains the virtual machine physical memory address 1 and the data length of the to-be-sent data based on the to-be-sent data descriptor 1 and the coding mode of the virtual machine network interface card 116, converts the virtual machine physical memory address 1 to a physical address 1 in the memory 105 to which the virtual machine physical memory address 1 is mapped, and encodes, according to the coding mode that can be recognized by the physical network interface card 107, the physical address 1 in the memory 105 and the data length of the to-be-sent data into the to-be-sent data descriptor 2.

Step 3: The Hypervisor 106 saves the to-be-sent data descriptor 2 into the physical sending queue according to the correspondence between the virtual sending queue and the physical sending queue.

Step 4: The physical network interface card 107 reads the to-be-sent data on the virtual machine 110 based on the to-be-sent data descriptor 2 in the physical sending queue.

When the host 100 has the IOMMU and the physical network interface card 107 has the DMA function, the to-be-sent data descriptor 2 includes the virtual machine physical memory address 1 and the data length of the to-be-sent data. The physical network interface card 107 generates a direct access command based on the DMA function of the physical network interface card 107 and the IOMMU of the host 100, converts the virtual machine physical memory address 1 to the physical address 1 in the memory 105 to which the virtual machine physical memory address 1 is mapped, accesses data according to the physical address 1 in the memory 105 and the data length of the to-be-sent data, and obtains the to-be-sent data, to implement communication with the virtual machine 110.

When the host 100 does not have the IOMMU or the physical network interface card 107 does not have the DMA function, the to-be-sent data descriptor 2 includes the physical address 1 in the memory 105 to which the virtual machine physical memory address 1 is mapped and the data length of the to-be-sent data. The physical network interface card 107 accesses the to-be-sent data according to the physical address 1 in the memory 105 and the data length of the to-be-sent data, and obtains the to-be-sent data, to implement communication with the virtual machine 110.

Optionally, the physical network interface card 107 may read the to-be-sent data descriptor 2 from the physical sending queue by polling the physical sending queue. When the to-be-sent data descriptor 2 is saved in the physical sending queue, the Hypervisor 106 may also send an interrupt to the physical network interface card 107, so as to trigger the physical network interface card 107 to read the to-be-sent data descriptor 2 from the physical sending queue.

When the virtual machine 110 receives data sent by the external device 130, the external device 130 sends the data to the physical network interface card 107, and the physical network interface card 107 saves the data into the virtual machine 110.

In this case, the virtual queue 117 generated by the driver of the virtual machine network interface card 116 is a virtual receiving queue. The physical queue 413 generated by the driver of the physical network interface card 107 is a physical receiving queue, and the correspondence between the virtual queue 117 and the physical queue 413 is a correspondence between the virtual receiving queue and the physical receiving queue. The virtual machine 110 notifies, by using an idle descriptor, the physical network interface card 107 to save the data sent by the external device 103 into the virtual memory space 114. An idle descriptor 1 is stored in the virtual receiving queue. A specific process in which the physical network interface card 107 sends the data sent by the external device 130 to the virtual machine 110 is as follows:

Step 1: The Hypervisor 106 obtains the to-be-sent data descriptor 1 from the virtual receiving queue.

The idle descriptor 1 is included in a fourth storage space, that stores to-be-received data, in the virtual memory space 114. The fourth storage space is equivalent to a virtual machine physical memory address 2 and a maximum stored data length. The virtual machine physical memory address 2 points to a start location at which the to-be-received data is stored in the fourth storage space (a physical memory of the virtual machine). A data length of the to-be-received data is not greater than the maximum stored data length. The idle descriptor 1 generated by the driver of the virtual machine network interface card 116 is encoded according to the coding mode that can be recognized by the virtual machine network interface card 116.

Step 2: When the host 100 has the IOMMU and the physical network interface card 107 has the DMA function, the Hypervisor 106 obtains the virtual machine physical memory address 2 and the maximum stored data length based on the idle descriptor 1 and the coding mode of the virtual machine network interface card 116, and encodes, according to the coding mode that can be recognized by the physical network interface card 107, the virtual machine physical memory address 2 and the maximum stored data length into a to-be-sent data descriptor 2.

When the host 100 does not have the IOMMU or the physical network interface card 107 does not have the DMA function, the Hypervisor 106 obtains the virtual machine physical memory address 2 and the maximum stored data length based on the idle descriptor 1 and the coding mode of the virtual machine network interface card 116, converts the virtual machine physical memory address 2 to a physical address 2 in the memory 105 to which the virtual machine physical memory address 2 is mapped, and encodes, according to the coding mode that can be recognized by the physical network interface card 107, the physical address 2 in the memory 105 to which the virtual machine physical memory address 2 is mapped and the maximum stored data length into an idle descriptor 2.

Step 3: The Hypervisor 106 saves the idle descriptor 2 into the physical receiving queue according to the correspondence between the virtual receiving queue and the physical receiving queue.

Step 4: The physical network interface card 107 saves the to-be-received data into the virtual machine 110 according to the idle descriptor 2 in the physical receiving queue.

When the host 100 has the IOMMU and the physical network interface card 107 has the DMA function, the idle descriptor 2 includes the virtual machine physical memory address 2 and the maximum stored data length. The physical network interface card 107 generates a direct access command based on the DMA function of the physical network interface card 107 and the IOMMU in the host 100, converts the virtual machine physical memory address 2 to the physical address 2 in the memory 105 to which the virtual machine physical memory address 2 is mapped, and saves the to-be-received data into the virtual machine 110 according to the physical address 2 in the memory 105 to which the virtual machine physical memory address 2 is mapped and the maximum stored data length.

When the host 100 does not have the IOMMU or the physical network interface card 107 does not have the DMA function, the idle descriptor 2 includes the physical address 2 in the memory 105 to which the virtual machine physical memory address 2 is mapped and the maximum stored data length. The physical network interface card 107 saves the to-be-received data into the virtual machine 110 according to the physical address 2 in the memory 105 to which the virtual machine physical memory address 2 is mapped and the maximum stored data length.

Optionally, the physical network interface card 107 may read the idle descriptor 2 from the physical receiving queue by polling the physical receiving queue. When the idle descriptor 2 is saved in the physical receiving queue, the Hypervisor 106 may also send an interrupt to the physical network interface card 107, so as to trigger the physical network interface card 107 to read the idle descriptor 2 from the physical receiving queue.

Figure 7:
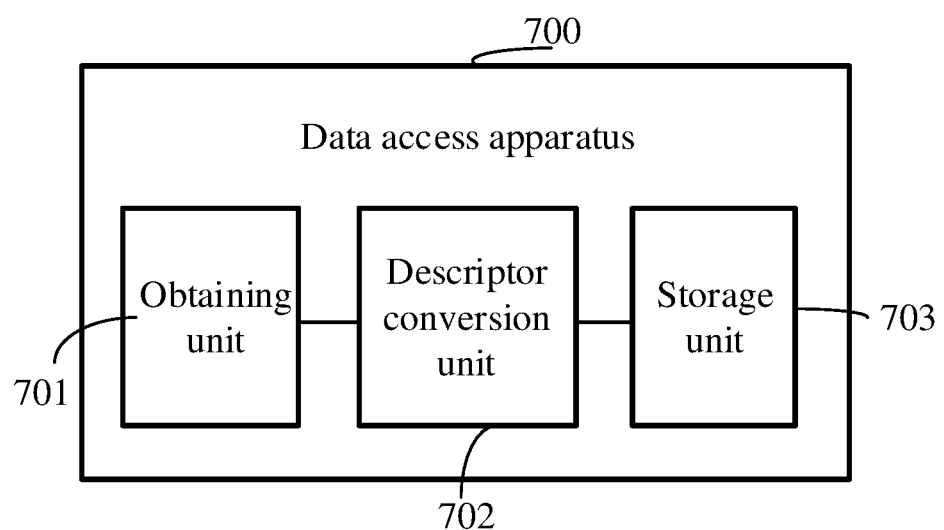
FIG. 7 is a schematic diagram of an apparatus in which a virtual machine communicates with a physical network interface card.

An embodiment further provides a data access apparatus 700, which is applied to a host 100. A virtual machine runs on the host 100, and the virtual machine includes a virtual machine interface card. As shown in FIG. 7, the data access apparatus 700 includes an obtaining unit 701 and a descriptor conversion unit 702. The obtaining unit 701 is configured to obtain a first descriptor from a memory 105. The first descriptor includes a virtual machine physical memory address and a data length of accessible data. The descriptor conversion unit 702 is configured to convert the first descriptor to a second descriptor. The second descriptor is encoded in a coding mode that can be recognized by a physical interface card, so that the physical interface card obtains, based on the second descriptor, a physical address that is in the memory and to which the virtual machine physical memory address is mapped, to access the accessible data. Further, the communications apparatus 700 further includes a storage unit 703. The memory stores a virtual queue of the virtual machine interface card and a physical queue of the physical interface card. The first descriptor is saved in the virtual queue, and there is a correspondence between the virtual queue and the physical queue. The storage unit 703 is configured to save the second descriptor into the physical queue according to the correspondence, so that the physical interface card obtains the second descriptor from the physical queue. The correspondence is saved in a first storage space in the memory, and the first storage space cannot be accessed by the virtual machine. Further, the descriptor conversion unit 702 is further configured to: obtain the virtual machine physical memory address based on the first descriptor; map the virtual machine physical memory address to the physical address in the memory; and encode the physical address in the memory and the data length to obtain the second descriptor. The second descriptor includes the physical address in the memory and the data length. In another implementation, in the apparatus 700, the accessible data is to-be-sent data, the virtual queue includes a virtual sending queue, the first descriptor is saved in the virtual sending queue, and the physical queue includes a physical sending queue. The apparatus 700 further includes a storage unit 703. The storage unit 703 is further configured to save the second descriptor into the physical sending queue. In another implementation, in the apparatus 700, the virtual queue includes a virtual receiving queue, the physical queue includes a physical receiving queue, the accessible data is to-be-received data, and the first descriptor is saved in the virtual receiving queue. The apparatus 700 further includes a storage unit 703. The storage unit is further configured to save the second descriptor into the physical receiving queue.

For example, the obtaining unit 401 may be implemented by executing a computer instruction by using the processor 104 shown in FIG. 1, and the computer instruction is used to implement step 501 in FIG. 5. The descriptor conversion unit 702 may be implemented by executing a computer instruction by using the processor 104 shown in FIG. 1, and the computer instruction is used to implement step 502 in FIG. 5. The storage unit 703 may be implemented by executing a computer instruction by using the processor 104 shown in FIG. 1. As described in FIG. 1, the processor 104 may be a CPU, or may be an ASIC, an FPGA, or another programmable logic device, a transistor logic device, a hardware component, or any combination thereof. For a processor without an instruction storage apparatus, for example, a CPU, the computer instructions are stored in a memory. The obtaining unit 401, the descriptor conversion unit 702, and the storage unit 703 are implemented by executing the computer instructions in the memory by using the processor 104. For a processor with an instruction storage apparatus, for example, an FPGA, the instructions are stored in a processor. The obtaining unit 401, the descriptor conversion unit 702, and the storage unit 703 are implemented by executing the computer instructions in the processor by using the processor.

Correspondingly, an embodiment further provides a non-volatile readable storage medium that includes a computer instruction. The computer instruction in the non-volatile readable storage medium is used by a physical network interface card to access data on a virtual machine on a host. A processor of the host executes the computer instruction to implement a function implemented by the processor of the host in this embodiment. The computer instruction in the non-volatile readable storage medium is used to implement a function of a management program. In this embodiment, a product form of the function implemented by the management program may be a computer program module in the management program, or may be an independently installed plug-in. A specific product form is not limited in this embodiment. Correspondingly, an embodiment further provides a computer program product, which includes a computer instruction used for communication of a virtual machine running on a host. A processor of the host executes the computer instruction to implement a function implemented by the processor of the host in this embodiment.

In the several embodiments provided, it should be understood that the disclosed apparatus and method may be implemented in other manners. In addition, the displayed or discussed mutual couplings or direct couplings or communication connections may be implemented by using some interfaces. The indirect couplings or communication connections between the apparatuses or units may be implemented in electrical, mechanical, or other forms. The units described as separate parts may or may not be physically separate. The computer instruction may be stored in one or more separate non-volatile readable storage media.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

The foregoing descriptions are merely specific implementations, but are not intended to limit the protection scope of the present disclosure. Any variation or replacement readily figured out by a person skilled in the art within the technical scope disclosed shall fall within the protection scope of the present disclosure. Therefore, the protection scope of the present disclosure shall be subject to the protection scope of the claims.

What is claimed is:

1. A data access method implemented by a host, the data access method comprising:
   obtaining, by a processor of the host from a memory of the host, a first descriptor comprising a virtual machine physical memory address and a data length of accessible data, wherein the virtual machine physical memory address points to a start location at which the accessible data are stored in a physical memory of a virtual machine running on the host, and wherein the first descriptor is encoded in a first coding mode that is configured to be recognized by a virtual machine interface card of the virtual machine;
   converting, by the processor and based on a first correspondence, the first descriptor to a second descriptor encoded in a second coding mode that is configured to be recognized by a physical interface card of the host, wherein the first correspondence indicates a mapping relationship between the first descriptor and the second descriptor, and wherein the first correspondence is inaccessible to the virtual machine;
   receiving, by the physical interface card based on the second descriptor, a physical address that is in the memory and that maps to the virtual machine physical memory address; and
   accessing, by the physical interface card according to the physical address in the memory, the accessible data.

2. The data access method of claim 1, wherein the second descriptor comprises the virtual machine physical memory address and the data length, and wherein the data access method further comprises:
   sending, by the physical interface card to a memory management unit, a query message to query the physical address in the memory, wherein the query message comprises the virtual machine physical memory address; and
   further receiving, by the physical interface card from the memory management unit, the physical address.

3. The data access method of claim 1, wherein converting the first descriptor to the second descriptor comprises:
   obtaining, by the processor based on the first descriptor, the virtual machine physical memory address;
   mapping, by the processor, the virtual machine physical memory address to the physical address in the memory; and
   encoding, by the processor, the physical address and the data length to obtain the second descriptor,
   wherein the second descriptor comprises the physical address and the data length.

4. The data access method of claim 1, further comprising:
   storing, by the memory, a virtual queue of the virtual machine interface card, a physical queue of the physical interface card, and a second correspondence between the virtual queue and the physical queue;
   saving, by the processor, the first descriptor in the virtual queue;
   saving, by the processor according to the second correspondence, the second descriptor into the physical queue; and
   obtaining, by the physical interface card from the physical queue, the second descriptor.

5. The data access method of claim 4, wherein the physical queue comprises a physical sending queue, and wherein the data access method further comprises further saving, by the processor, the second descriptor into the physical sending queue.

6. The data access method of claim 4, wherein the physical queue comprises a physical receiving queue, and wherein the data access method further comprises saving, by the processor, the second descriptor into the physical receiving queue.

7. The data access method of claim 1, wherein a driver corresponding to the physical interface card is not installed on the virtual machine running on the host.

8. A host comprising:
   a memory;
   a physical interface card;
   a virtual machine associated with a virtual machine interface card;
   a physical memory associated with the virtual machine; and
   a processor coupled to the memory, the physical interface card, and the physical memory and configured to:
      obtain, from the memory, a first descriptor comprising a virtual machine physical memory address and a data length of accessible data, wherein the virtual machine physical memory address points to a start location at which the accessible data are stored in the physical memory, and wherein the first descriptor is encoded in a first coding mode that is configured to be recognized by the virtual machine interface card; and
      convert, based on a first correspondence, the first descriptor to a second descriptor encoded in a second coding mode that is configured to be recognized by the physical interface card, wherein the first correspondence indicates a mapping relationship between the first descriptor and the second descriptor, and wherein the first correspondence is inaccessible to the virtual machine, and
   wherein the physical interface card is configured to:
      receive, based on the second descriptor, a physical address that is in the memory and that maps to the virtual machine physical memory address, and
      access, according to the physical address in the memory, the accessible data.

9. The host of claim 8, wherein the second descriptor comprises the virtual machine physical memory address and the data length, and wherein the physical interface card is further configured to:
   send, to a memory management unit, a query message to query the physical address in the memory, wherein the query message comprises the virtual machine physical memory address; and
   further receive, from the memory management unit, the physical address.

10. The host of claim 8, wherein the processor is further configured to:
    obtain, based on the first descriptor, the virtual machine physical memory address;
    map the virtual machine physical memory address to the physical address in the memory; and
    encode the physical address and the data length to obtain the second descriptor,
    wherein the second descriptor comprises the physical address and the data length.

11. The host of claim 8, wherein the memory is configured to store a virtual queue of the virtual machine interface card, a physical queue of the physical interface card, and a second correspondence between the virtual queue and the physical queue, wherein the processor is further configured to:
- save the first descriptor in the virtual queue; and
- save, according to the second correspondence, the second descriptor into the physical queue,
- wherein the physical interface card is further configured to obtain, from the physical queue, the second descriptor.

12. The host of claim 11, wherein the physical queue comprises a physical sending queue, and wherein the processor is further configured to save the second descriptor into the physical sending queue.

13. The host of claim 11, wherein the physical queue comprises a physical receiving queue, and wherein the processor is further configured to save the second descriptor into the physical receiving queue.

14. The host of claim 8, wherein a driver corresponding to the physical interface card is not installed on the virtual machine running on the host.

15. A computer program product comprising computer-executable instructions for storage on a non-transitory computer-readable medium that, when executed by a processor, cause a host to:
- obtain, from a memory of the host, a first descriptor comprising a virtual machine physical memory address and a data length of accessible data, wherein the virtual machine physical memory address points to a start location at which the accessible data are stored in a physical memory of a virtual machine running on the host, and wherein the first descriptor is encoded in a first coding mode that is configured to be recognized by a virtual machine interface card of the virtual machine;
- convert, based on a first correspondence, the first descriptor to a second descriptor encoded in a second coding mode that is configured to be recognized by a physical interface card, wherein the first correspondence indicates a mapping relationship between the first descriptor and the second descriptor, and wherein the first correspondence is inaccessible to the virtual machine;
- receive, by the physical interface card based on the second descriptor, a physical address that is in the memory and that maps to the virtual machine physical memory address; and
- access, by the physical interface card according to the physical address in the memory, the accessible data.

16. The computer program product of claim 15, wherein the second descriptor comprises the virtual machine physical memory address and the data length, and wherein the instructions further cause the host to:
- send, by the physical interface card to a memory management unit, a query message to query the physical address in the memory, wherein the query message comprises the virtual machine physical memory address; and
- further receive, by the physical interface card from the memory management unit, the physical address.

17. The computer program product of claim 15, wherein when converting the first descriptor to the second descriptor, the instructions further cause the host to:
- obtain, by the processor based on the first descriptor, the virtual machine physical memory address;
- map, by the processor, the virtual machine physical memory address to the physical address in the memory; and
- encode, by the processor, the physical address and the data length to obtain the second descriptor,
- wherein the second descriptor comprises the physical address and the data length.

18. The computer program product of claim 15, wherein the instructions further cause the host to:
- store, by the memory, a virtual queue of the virtual machine interface card, a physical queue of the physical interface card, and a second correspondence between the virtual queue and the physical queue;
- save, by the processor, the first descriptor in the virtual queue;
- save, by the processor according to the second correspondence, the second descriptor into the physical queue; and
- obtain, by the physical interface card from the physical queue, the second descriptor.

19. The computer program product of claim 18, wherein the physical queue comprises a physical sending queue, and wherein the instructions further cause the host to further save, by the processor, the second descriptor into the physical sending queue.

20. The computer program product of claim 15, wherein a driver corresponding to the physical interface card is not installed on the virtual machine running on the host.

* * * * *